June 1, 1965  G. M. RONEY  3,186,380
CLAMP TYPE ANIMAL RESTRAINING DEVICE
Filed Nov. 27, 1962 2 Sheets-Sheet 1

June 1, 1965   G. M. RONEY   3,186,380
CLAMP TYPE ANIMAL RESTRAINING DEVICE
Filed Nov. 27, 1962   2 Sheets-Sheet 2

United States Patent Office 3,186,380
Patented June 1, 1965

3,186,380
CLAMP TYPE ANIMAL RESTRAINING DEVICE
George Monroe Roney, R.F.D. 3, Swaledale, Iowa
Filed Nov. 27, 1962, Ser. No. 240,265
1 Claim. (Cl. 119—103)

This invention relates generally to animal restraining devices and more specifically this invention relates to a device for clamping animals in an inverted position.

The castration of small animals, such as pigs, has been accompanied by a number of problems. The pigs must be securely held in a convenient position in order to insure a proper incision. Unless a restraining device is used it is exceedingly difficult for one person to perform the operation. If a restraining device is used it must securely restrain the animal and yet not cause injury. The animal must be easily inserted into and removed from the restraining device so that one person may conveniently perform the entire operation.

In response to the above problems this invention has as its object the provision of a pig restraining device which can be operated by only one person, and this one person may easily insert and remove the animal by using a foot pedal to lock and unlock the device, thus leaving the hands free for positioning the animal. In addition, the invention provides a restraining device which will hold a pig at a height and in a position such that the operation may be conveniently performed.

Another object of the invention is to provide a safe restraining device which will remove many hazards of the operation both as to the operator and to the animals.

A further object is the provision of an adjustable clamp which resiliently provides pressure around the body of the animal.

A further object of the invention is to provide an animal restraining device which may be moved conveniently from one locality to another and hooked over a pigpen fence in an operable position.

In operation, the invention has as its object the provision of a rapid, safe, humane animal restraining device.

Further objects and advantages will become apparent from the following description taken in conjunction with the drawings.

Figure 1:
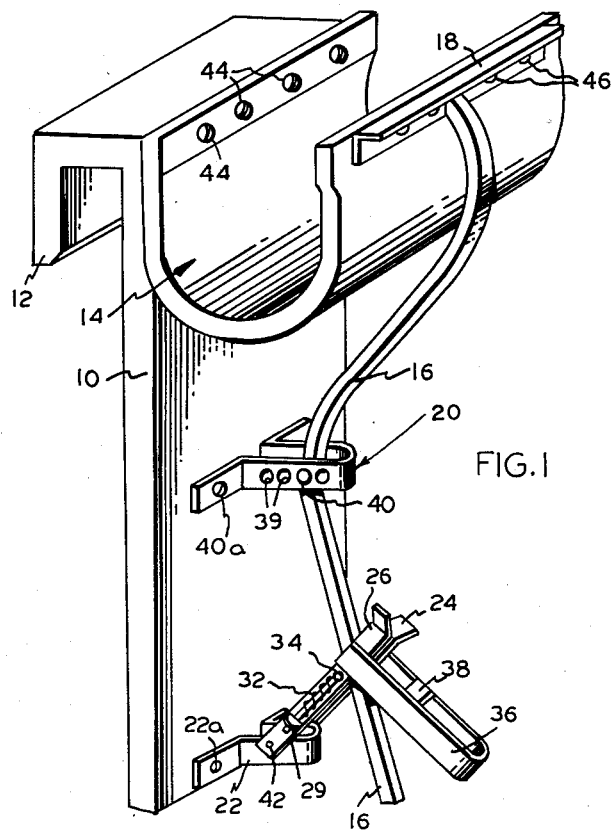
FIGURE 1 is a perspective view of one embodiment of the invention.
Figure 2:
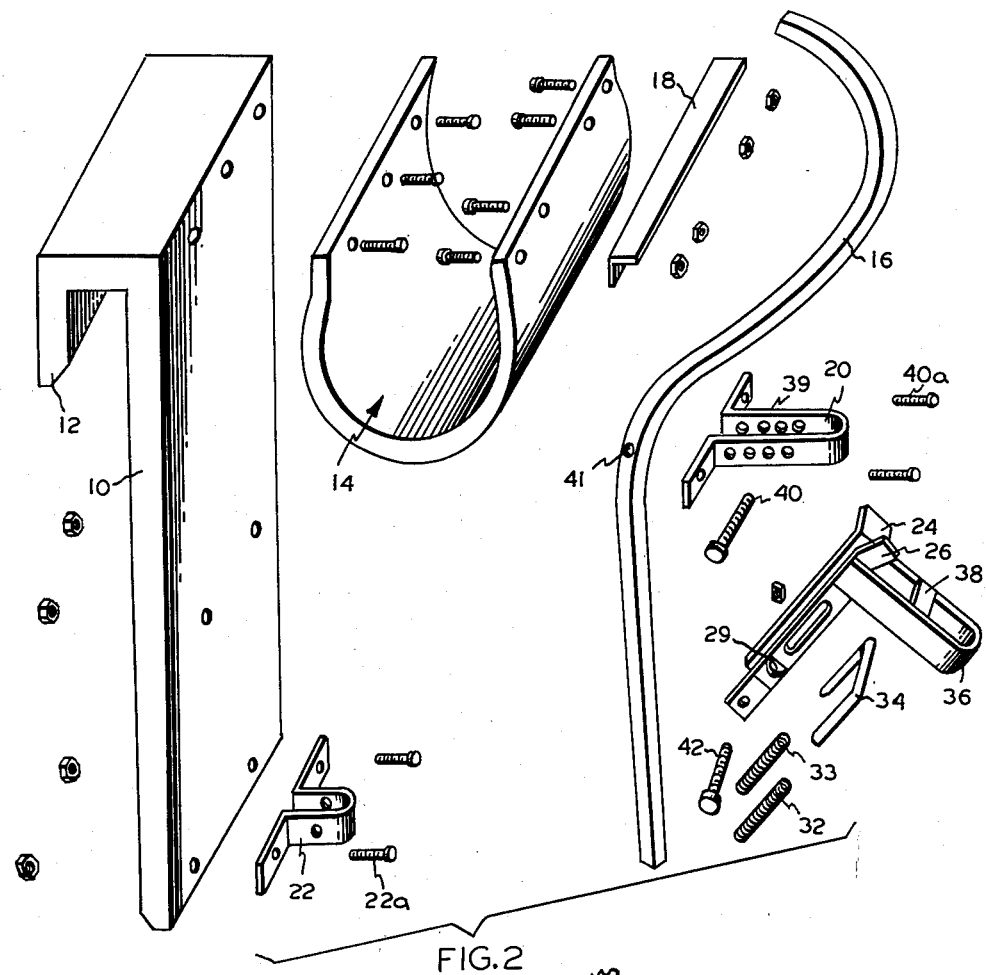
FIGURE 2 is an exploded, perspective view of the embodiment assembled in FIGURE 1.

Referring now to FIGURES 1 and 2, a supporting member 10 is shown with a hook-like portion 12 on the upper end which serves to engage a suitable supporting means, such as the top rail of a board fence. Also attached to the upper end of the supporting member 10 is a curved cradle 14 which may be conveniently made of a section of a rubber vehicle tire or a piece of discarded belting. The inner edge of the cradle 14 is attached to supporting member 10 along the length of one side by a series of bolts 44. On the opposite side of the cradle, a brace 18 is attached by means of bolts 46 thereby uniformly supporting the outer edge of the cradle. A lever bar 16 of a convenient configuration is attached to the brace 18 at one end and pivotally attached at a point along its length to bracket 20 which is fastened to an intermediate point on supporting member 10 by bolts 40a. By this arrangement pivotal movement of the lever bar 16 selectively moves the brace 18 and its attached cradle portion selectively toward or away from the supporting member 10. This action opens or closes the upper edges of the cradle. Means are provided for locking the lever bar 16 in a closed position as described below. When an animal is placed in the cradle 14 in an inverted position the lever 16 may be used to move the upper portions of the cradle together, thereby partially encompassing and resiliently enclosing the animal.

Since a degree of adjustment is required to allow the device to be utilized on animals of various sizes, the pivot bracket 20 is provided with a plurality of holes 39 located at selected distances from the supporting member 10. Pivot pin 40 may be selectively passed through one pair of holes 39 in bracket 20 and hole 41 in the lever bar 16. By selecting a different pair of the holes 39 the fulcrum of the lever bar 16 may be changed. In this manner, a fixed movement at the lower end of lever bar 16 may selectively produce various desired movements of the upper edge of the cradle 14.

Figure 3:
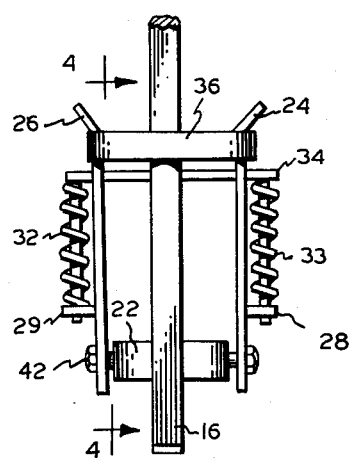
FIGURE 3 is a fragmentary front elevation view of the lever locking assembly.

A releasable locking means is provided at the lower end of the lever bar 16. The locking assembly is supported by a bracket 22 which extends laterally from the supporting member 10 and is fastened to the lower portion thereof by means of bolts 22a. A pedal assembly is pivotally attached to said bracket by means of a bolt 42. This pedal assembly is preferably positioned sufficiently low so as to allow the operator's foot to depress it. As shown in FIGURES 2 and 3 the pedal assembly is formed by a pair of pivotally attached bars 24 and 26 having a laterally extending pedal member 36 securely attached to each of said bars. A cross member 38 adds strength to the assembly and acts as a stop which engages the lower portion of lever bar 16 to maintain the pedal assembly in a locked position. Along the length of both bars 24 and 26 a longitudinal slot 31a and a longitudinal slot 31 (respectively) are provided. A U shaped tension bar 34 is provided which consists of a cross member and two perpendicular, parallel legs positioned a short distance from each end of said cross member. The tension bar 34 is positioned within the slots 31a and 31 in such a fashion that the legs of said tension bar extend parallel to said slots. On the sides of each of the bars 24 and 26, tension bar guides 28 and 29 are attached in such a position that holes in the face of these guides slidably receive the legs of the tension bar 34. Compression springs 32 and 33 are placed around the legs of the tension bar 34 between the guides 28 and 29 and the juncture of the legs with the cross member of said tension bar 34. The guides 28 and 29 act as seats for the compression springs and in conjunction with the cross member of the tension bar 34 resiliently resist movement of the cross member of the tension bar 34 toward said guides.

Figure 4:
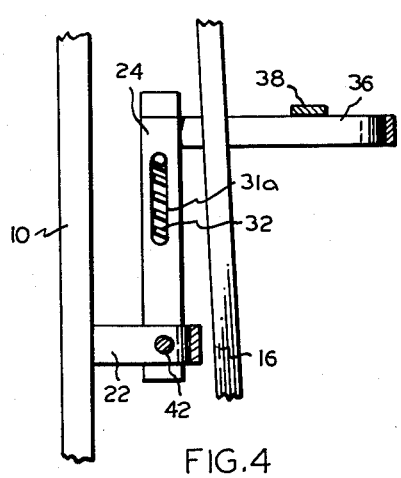
FIGURES 4, 5 and 6 are fragmentary sequential side elevation views taken through 4—4 of FIGURE 3 showing the lever locking assembly in various positions of its operation.
Figure 5:
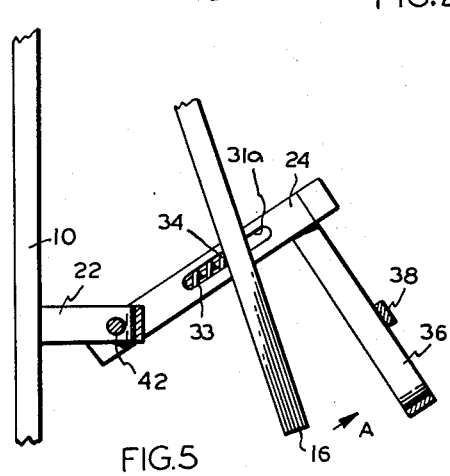
Figure 6:
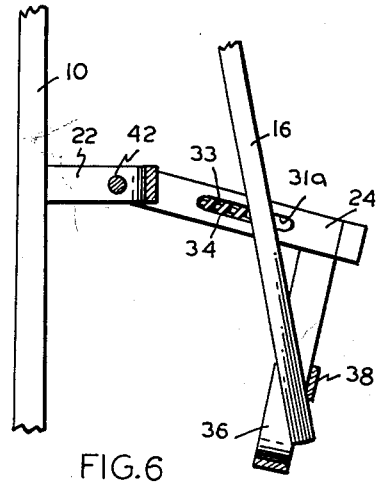

The cooperation of the locking assembly and the lever 16 may be more fully understood by reference to FIGURES 4, 5 and 6. When the cradle is in the wide open position, the locking assembly is attached to the bracket 22 so that the bars 24 and 26 extend substantially vertically above bracket 22 (see FIGURE 4). In this position the bars 24 and 26 will be stationed substantially entirely between the support member 10 and the lower end of lever bar 16. Pivotal movement of the locking assembly away from the supporting member 10 (in a clockwise direction) causes the top of the tension bar 34 to push outwardly against lever bar 16. In other words, a downward force on the foot pedal member 36 will cause the tension bar 34 to produce an outward force against the lower end of lever bar 16, thereby moving it in the counter clockwise direction indicated by arrow A (see FIGURE 5). Counter clockwise movement of the lower end of the lever bar 16 in the direction of arrow A results in a closing of the cradle mouth. This action also moves the tension bar 34 downwardly along the length of slots 31a and 31 in the direction of the pivot bolt 42. Downward movement of the tension bar 34 is of course resisted by the springs 32 and 33 so that the movement of the lever bar 16 is characterized by a degree of resilience. The downward movement of the tension bar 34 is continued until a line drawn between the pivotal axis 42 and the tension bar 34 is approximately at right angles to the length of lever bar 16. At this point the maximum depression of the compression springs 32 and 33 due to the cradle closing operation is reached and it may be referred to as the "over center" point. As the movement of the pedal assembly is further continued downwardly in a clockwise direction the tension bar 34 then will begin to reverse its direction and ride up the slots 31a and 31 away from the pivot point 42. This outward movement of bar 34 will be assisted by the compression springs 32 and 33. This outward force serves to lock the lever bar 16 in a clamping position.

Since a certain amount of resilience is desired in the cradle 14 the pedal assembly is further pushed downwardly beyond the "over center" point, thus relaxing the springs 32 and 33 somewhat and providing a degree of "play" in the compression springs but still maintaining an outward resilient force against the lever bar 16. This resilience prevents the cradle from injuring an animal placed therein. As shown in FIGURE 6 downward (clockwise) pivotal movement of the locking assembly is limited by the contact of the lower end of the lever bar 16 with the cross member 38 on pedal 36.

The arrangement described above may be placed on a board fence by means of the hook portion 12. The cradle 14 is initially placed in its open position. In this position the foot pedal 36 will extend substantially perpendicularly with respect to the supporting member 10. A small pig may be grasped by the front feet with one hand and the back feet with the other hand, then lifted and inverted. The pig may then be placed with its back along the bottom of the cradle member 14. At this point the operator can place his foot on the pedal 36 and push downwardly. The pedal assembly will move pivotally downward (clockwise) and cause the tension bar 34 to pivot the curved lever bar 16 (counter clockwise) about its fulcrum bracket 29. In the course of fully depressing the pedal 36, the tension bar 34 passes the maximum compression or "over center" point of springs 32 and 33. When the pedal 36 is in its fully depressed position the tension bar resiliently retains the lever bar 16 against substantial pivotal movement. This action clamps the pig in the cradle 14 with its front quarter protruding from one side of the cradle and its back quarter from the other so that castration or other veterinary operations may be performed on the animal. The cardle 14 clamps the pig in a manner resembling the closing of a giant hand around the pig's middle portion.

After the desired operation has been performed on the pig the clamp 14 must be released. The operator may do this very simply by catching his toe under the end of the lower end of pedal 36 (see FIGURE 6) and moving it in a reverse pivotal (counter clockwise) direction. In the present embodiment upward movement of the pedal will again move the tension bar 34 to its maximum downward position in the slots 31a and 31. When the compression springs have passed this point of maximum depression and the tension bar 34 begins to move up the slots 31a and 31 the release will be effectuated by virtue of the decompression of compression springs 32 and 33. Therefore, the foot pedal need only be moved upwardly until this "over center" point is reached then the springs 32 and 33 will complete the cradle opening operation. This allows the cradle to be quickly and easily released and the animal may be lifted out of the cradle.

While there are advantages apparent in the particular forms selected for the components of the device in the above-described embodiment, other equivalent forms will be obvious to those skilled in this art. For example, the curved configuration of the lever bar 16, while providing a distinct relationship between the movement of the foot pedal and the clamping of the cradle, is preferred but this might be formed in a different manner with appropriate repositioning of the other components of the device. Also, the tension bar biasing means might be supplied in a different but equivalent manner to the preferred compression springs described above. Such variations should not be considered to deviate from the present invention as described in the appended claim.

I claim:
An animal holding device comprising:
(a) a vertical support member having means to attach the device to a base member such as a fence,
(b) a flexible cradle member having one side thereof attached to said support member,
(c) a laterally movable brace member attached to the side of said cradle member opposite said support member,
(d) said brace member being fixedly attached to the upper end of a lever member which is pivotally attached to said support member whereby said cradle member is suspended between said brace member and said support member,
(e) a locking pedal assembly pivotally attached to the lower end of said support member and including
 (1) a pair of bars having slots along the length thereof,
 (2) a pedal member laterally attached to both of said bars,
 (3) a guide member having holes in the face thereof laterally attached on each of said bars,
 (4) a tension bar adapted to ride in said slots and having a pair of legs extending through the holes in said guide members,
 (5) spring members positioned on said legs and adapted to resiliently resist movement of said tension bar toward the axis of said locking pedal assembly,
(f) said locking pedal assembly being positioned so that a downward force on the pedal portion of said assembly moves said tension bar against said lever member causing pivotal movement thereof and also movement of the cradle brace toward the vertical support member until the angle between said lever member and a line extending through said tension bar and the pivotal axis of said locking pedal assembly is 90°, and
(g) a cross bar attached to said pedal member positioned so as to contact and restrain the lever at a point subsequent to the 90° angle relationship of the lever bar and the line between the tension bar and the pivotal axis of said locking pedal assembly.

References Cited by the Examiner
UNITED STATES PATENTS

| | | | |
|---|---|---|---|
| 2,789,538 | 4/57 | Merritt | 119—103 |
| 2,939,425 | 6/60 | Taylor et al. | 119—103 |

FOREIGN PATENTS

| | | |
|---|---|---|
| 222,776 | 7/59 | Australia. |
| 458,261 | 7/49 | Canada. |

ALDRICH F. MEDBERY, *Examiner.*

SAMUEL KOREN, *Primary Examiner.*